(12) United States Patent
Miller, III

(10) Patent No.: US 6,942,798 B2
(45) Date of Patent: Sep. 13, 2005

(54) VACUUM RETORT ANAEROBIC DIGESTION SYSTEM AND PROCESS

(76) Inventor: Herman P. Miller, III, P.O. Box 1769, Stockton, CA (US) 95201-1769

( * ) Notice: Subject to any disclaimer, the term of this patent is extended or adjusted under 35 U.S.C. 154(b) by 1 day.

(21) Appl. No.: 10/686,494

(22) Filed: Oct. 14, 2003

(65) Prior Publication Data

US 2004/0134853 A1 Jul. 15, 2004

Related U.S. Application Data

(63) Continuation-in-part of application No. 09/766,140, filed on Jan. 19, 2001, now Pat. No. 6,632,362.

(51) Int. Cl.⁷ .................................................. C02F 3/28
(52) U.S. Cl. ...................... 210/603; 210/612; 210/631; 210/175; 210/192; 210/259
(58) Field of Search ................................ 210/603, 612, 210/613, 631, 175, 188, 252, 258, 192, 259

(56) References Cited

U.S. PATENT DOCUMENTS

| | | | | |
|---|---|---|---|---|
| 2,188,847 A | * | 1/1940 | Streander | 210/603 |
| 2,640,027 A | * | 5/1953 | Fay et al. | 210/603 |
| 4,372,856 A | * | 2/1983 | Morrison | 210/603 |
| 4,482,458 A | * | 11/1984 | Rovel et al. | 210/603 |
| 4,696,746 A | * | 9/1987 | Ghosh et al. | 210/603 |
| 5,185,079 A | * | 2/1993 | Dague | 210/603 |
| 6,464,875 B1 | * | 10/2002 | Woodruff | 210/603 |

FOREIGN PATENT DOCUMENTS

JP          56-168894          * 12/1981

* cited by examiner

Primary Examiner—Fred G. Prince

(57) ABSTRACT

Anaerobic digestion system and process in which a liquor containing a digestible biomass is processed a retort vessel at a thermophilic temperature and with a vacuum pressure at the surface of the liquor. A pressurized feedstock is introduced into the vessel so that the feedstock impacts upon the surface of the liquor in a manner which serves to break up any scum on the surface and produce a mixing of the liquor.

16 Claims, 8 Drawing Sheets

VACUUM RETORT ANAEROBIC DIGESTION SYSTEM AND PROCESS

RELATED PATENTS

This is a continuation-in-part of Ser. No. 09/766,140, filed Jan. 19, 2001, U.S. Pat. No. 6,632,362.

The invention also makes use of the processes and systems of U.S. Pat. No. 6,291,232, and Ser. No. 10/225,310, filed Aug. 21, 2002, the disclosures of which are incorporated herein by reference.

BACKGROUND OF THE INVENTION

1. Field of Invention

This invention pertains generally to anaerobic digesters and, more particularly, to a system and process that significantly extends the efficiency, control, and applicability of anaerobic digesters to all of the many and variously different liquefied bio-waste products over a wide variety of conditions and concentrations.

2. Related Art

Energy costs have always been a concern in wastewater treatment facilities, with larger plants being required to handle hydraulic loads of millions of gallons per day.

Such plants have generally involved relatively large structures, with different parts of them being designed by specialists in the different functions which they perform. As a result, the costs of design and operation have been higher than they might have been if the design process were better integrated.

U.S. Pat. No. 5,185,079 describes a sequenced batch process which is widely used in the industry at this time. However, waste streams are almost always continuous and often vary dramatically in flow rates, and batch processes of that type cannot be operated in a continuous mode without losing large quantities of solids to allow room for influent liquor, or supernatant. They must be shut down to allow for settling of the solids, otherwise the supernatant that is drawn off and returned to the plant influent is loaded with solids that must again be separated.

U.S. Pat. No. 5,540,839 discloses another cyclical degradation process, utilizing a combination of mesophilic and thermophilic steps, which is said to degrade organic matter completely to gaseous products. It does not, however, teach the use of such a process in a continuous flow mode.

U.S. Pat. No. 5,630,942 discloses a two phase anaerobic digestion process utilizing thermophilic fixed growth bacteria in which different phases of the digestion process are carried out in different tanks.

Heretofore, a major drawback to anaerobic treatment processes has been the manner in which excess liquid is controlled and eliminated. That has commonly been done by a technique commonly known as supernatant wasting in which putrid thin liquor is drained off and pumped back to the plant inflow in order to maintain the minimum concentration of volatile solids required for anaerobic colonization and the degradation of bio-solids to take place. That is an energy consuming process which also increases the volumetric capacity requirements of the system and requires the operation of a plug flow procedure in order to allow settling of the solids.

Processes for treating domestic wastewater, liquefied bio-waste, and commercial and industrial liquid waste have historically used two distinct classes or systems of bacteria to reduce the bio-solids contained therein to gases and to more biologically stable organic and inorganic matter. While one ideally might want to completely destroy the organic fraction of this mixture, the energy intensity and extended reaction times of a system for doing so would become physically impractical and economically prohibitive. The two bacterial systems in use today are the aerobic and anaerobic systems.

Aerobic processes require the mixing of air or pure oxygen into the liquor being treated so that aerobic bacteria known as aerobes grow, attack, and biochemically reduce the solids. Aerobic processes are relatively easy to devise, and there are many such systems in use throughout the world.

A desire for higher and higher quality effluents has contributed to the expansion and proliferation of aerobic processes. However, there are a number of disadvantages to aerobic processes. They are generally open processes that have odor problems, they tend to require multiple large tanks or ponds that have big footprints and require considerable space, they consume large quantities of energy in the form of electrical power, and produce large quantities of greenhouse gases. Approximately, 60% to 70% of the energy required in modern domestic wastewater treatment plants is directly attributed to aerobic processes.

Conversely, anaerobic processes can be net energy producers. They operate in closed tanks or vessels devoid of oxygen, at an elevated temperature. Although they are sometimes more difficult to control, they produce a raw or "oil" gas that generally contains approximately 64% methane (natural gas), 34% carbon dioxide, and 2% hydrogen sulfide. Mixed with these gases as removed from a digester are quantities of water vapor, which vary from about 5% to 10% at mesophilic temperatures (about 35° C.) to about 30% to 35% at thermophilic temperatures (about 55° C.), rendering the use of vacuum pumps and blowers totally impractical. Even with the best water traps and cooling systems, maintaining the kinds of pumps and blowers used to increase gas line pressure for mixing and burning is a continual problem.

Another problem with modern digesters is that they cannot be operated at a negative dome pressure. The roofs of such digesters, especially floating types, are not structurally designed for such loading, there are too many places where air can leak into the dome space and produce a dangerous explosive mixture.

The limiting factor that has prevented all wastewater feedstock from being treated anaerobicly is the high ratio of water to bio-solids (volatile solids) contained in the feedstock. Domestic wastewater typically contains as little as 0.01% volatile solids, whereas it is generally difficult to maintain anaerobic action below a minimum threshold of about 3% to 5% volatile solids. Therefore, anaerobic digestion is commonly limited to a relatively small part of the influent that either settles readily or floats to the top of large primary and secondary sedimentation tanks, leaving a very large portion of the influent to be processed by aerobic activated sludge processes.

The energy produced by anaerobic systems in the form of methane gas is a direct function of the quantity of volatile solids or biomass reduced in the process. Therefore, the net positive energy generated is generally limited severely by the ratio of water to volatile solids in the digester influent, irrespective of several chemical-thermal-mechanical factors that determine digester efficiency.

Also, depending upon the feedstock, there has generally been an operating point at which it becomes more efficient to transfer a portion of the treated influent to aerobic processing. This limitation can be overcome to some extent by the addition of external bio-solids (e.g., food, animal or agricultural solids, grass clippings, tree trimmings, cardboard, and other bio-waste products) to the anaerobic influent.

The inside of an anaerobic digester is a dirty, foul and dangerous place to work. Ideally, one would like to build a digester and never have to look inside for its expected life span of some thirty years. "Pancake" digesters, i.e. large diameter, low aspect ratio structures that are common in the U.S. but frowned upon in Europe, must be cleaned every several years. It is not uncommon to find several feet of "muck" at the bottom of a digester tank with vortices opening down to the pump-out inlets and to find as much as a foot of matted scum held together by hair, string, rags and the like floating on the surface of the liquor. Muck and scum both greatly decrease the effective size of the digester and, therefore, limit its efficiency.

Digesters of the type shown in U.S. Pat. No. 6,291,232 significantly reduce or eliminate the build-up of muck at the bottom of the digester tank. However, scum is still a real nuisance and hindrance to the digestive process. Cooking oils and greases, for example, form a stiff molasses type of scum that restrains gas bubbles and results in foaming that carries the oily bubbles up to the outlet and instrumentation ports, causing false instrument readings and clogging gas vents. The problem gets even worse as digester concentrations are made higher and more garbage, slaughterhouse wastes and solid wastes are brought into the digester.

OBJECTS AND SUMMARY OF THE INVENTION

It is in general an object of the invention to provide a new and improved anaerobic digestion system and process.

Another object of the invention is to provide an anaerobic system and process of the above character which the build-up of scum on the surface of the digestive mass is prevented and/or broken up.

Another object of the invention is to provide an anaerobic system and process of the above character which provide 100% energy independence, zero waste products, zero environmental pollution, potable distilled water production, and a pasteurized fertilizer, sludge or sludge cake product in a closed bio-thermodynamic system by.

These and other objects are achieved in accordance with the invention by providing an anaerobic digestion system and process in which a liquor containing a digestible biomass is processed a retort vessel at a thermophilic temperature and with a vacuum pressure at the surface of the liquor. A pressurized feedstock is introduced into the vessel so that the feedstock impacts upon the surface of the liquor in a manner which serves to break up any scum on the surface and produce a mixing of the liquor.

For convenience and clarity of illustration, details such as valves, indicators, sensors, pumps, and computers, are omitted from the drawings except where necessary to clarify the action of the system and process. Likewise, commonly used pretreatment and preprocessing equipment such as mixers, screens, and grinders is not shown.

DETAILED DESCRIPTION

Figure 1:
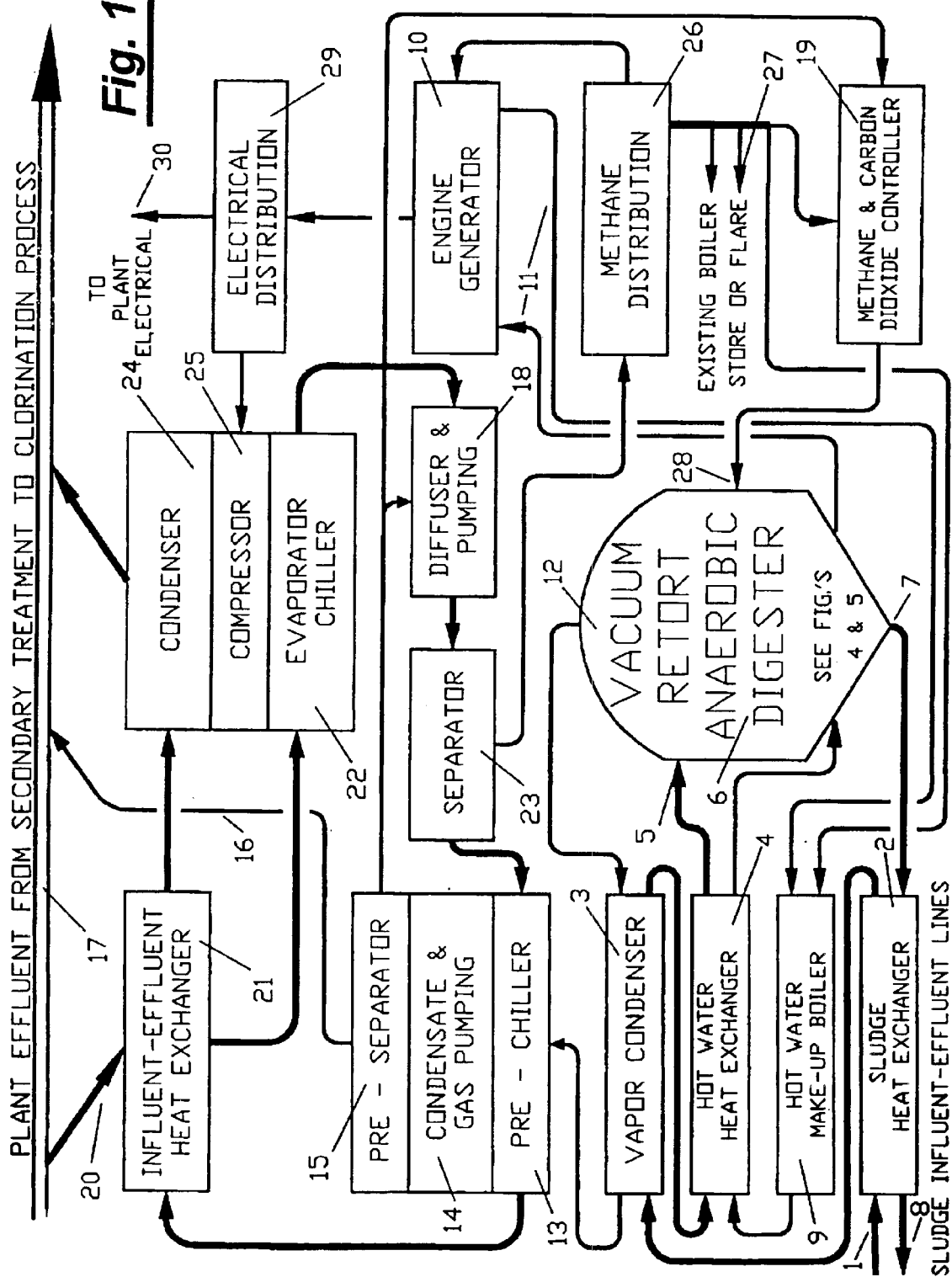
FIG. 1 is a schematic diagram of one embodiment of an anaerobic digestion system incorporating the invention as might, for example, be utilized in a domestic wastewater plant that has retrofitted its digester process or is splitting its flow between aerobic and anaerobic processes.

In the embodiment of FIG. 1, raw sludge removed from the primary and secondary sedimentation tanks is directed to the process at 1 where it is introduced to heat exchanger 2, raising its temperature. The raw sludge is additionally passed through vapor condenser and heat exchanger 3 and 4 to bring its temperature to above the thermophilic range before being passed through line 5 to the digester 6, insuring that any possible short circuiting in the digester will not prevent pasteurization. After digestion, the thickened sludge 7 returns to heat exchanger 2 before passing to sludge disposal line 8. A hot water or steam boiler 9 together with water jacket heat from engine generator 10 forms a heat loop 11 supplying heat to exchanger 4 and digester 6. Gas and water vapor exit the dome of the digester 12. The vapor of the mixture is condensed in 3 and passes along with the gas to pre-chiller 13 where it is further cooled and passes to gas diffuser pump 14. The combined action of condensing 3, cooling 13, and pumping 14 results in a vacuum in dome 12 that acts to increase the water vapor percentage of the water gas mix allowing for increased pumping at 14 until the desired water removal rate from the digester 6 has been reached. The water-gas mixture leaving pump 14 is pre-separated at 15, and water 16 is directed to the plant effluent line 17, while the gasses are directed to main gas diffuser and pump 18 with a bleed off to methane and carbon dioxide controller 19.

Sufficient water flow 20 is slipstreamed off the plant effluent line 17 to insure complete dissolution of carbon dioxide and hydrogen sulfide at a temperature close to freezing in diffuser 18. Water 20 passes through system chiller 22 to diffuser pump 18 where carbon dioxide and hydrogen sulfide are completely dissolved in solution leaving methane to be separated in 23. The cold water containing the dissolved gasses pass through pre-chiller 13, heat exchanger 21, and refrigeration condenser 24 absorbing heat and pre-cooling these items to reduce the load on compressor 25.

Pure methane from separator 23 is directed to methane distribution 26, is used to power engine generator 10, boiler 9, as digester pH control 28 through controller 19, and may be optionally sold, as indicated at 27. Electrical power from engine generator 10 is distributed at 29, powers compressor 25, and plant electrical loads 30.

Figure 2:
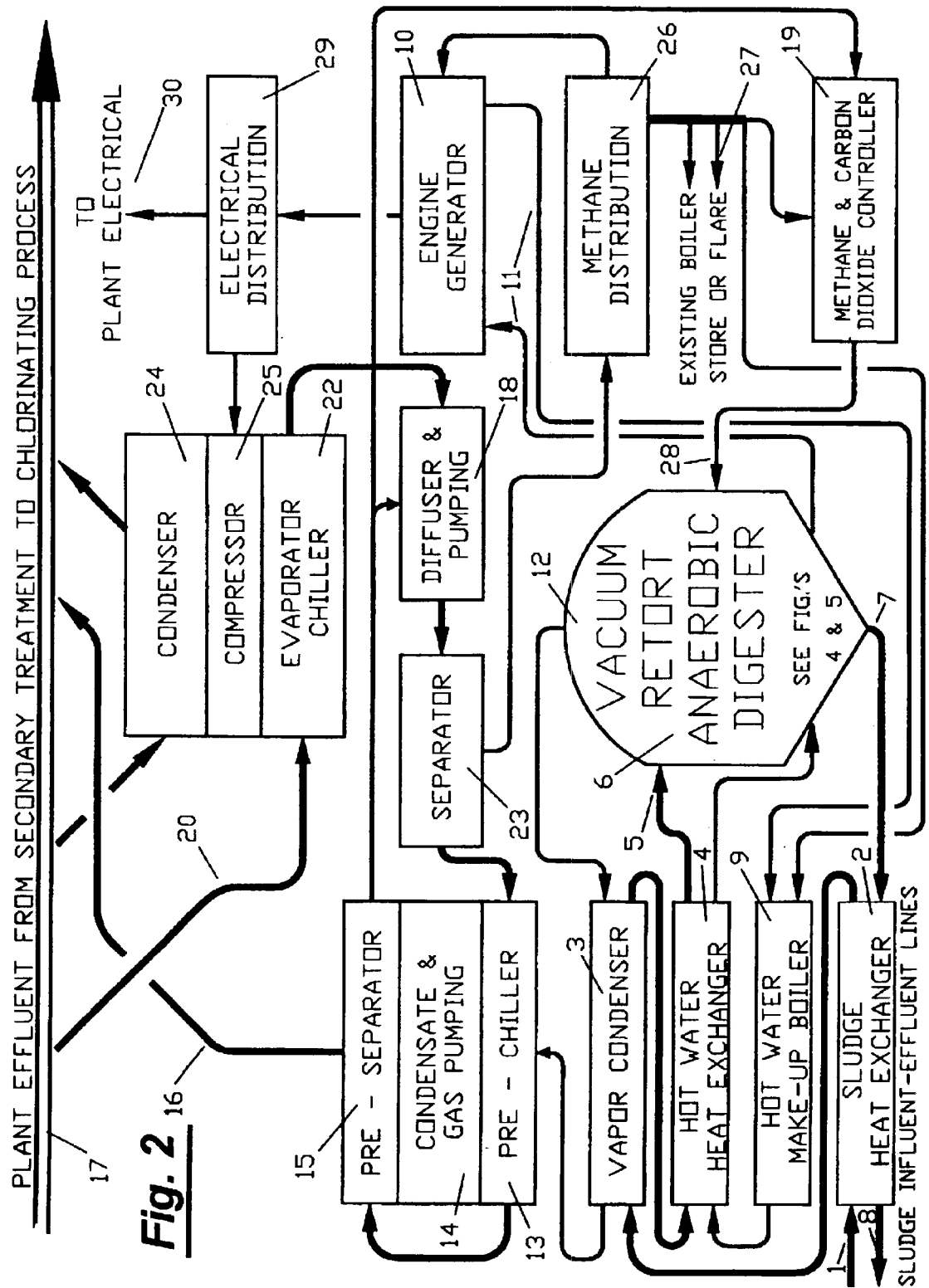
FIG. 2 is a schematic diagram of another embodiment of an anaerobic digestion system incorporating the invention which utilizes a water to volatile solids ratio that results in operation in a higher energy mode and eliminates the need for a major heat exchanger.

In the embodiment of FIG. 2, raw sludge removed from the primary and secondary sedimentation tanks is directed to the process at 1 where it is introduced to heat exchanger 2, raising its temperature. The raw sludge is additionally passed through vapor condenser and heat exchanger 3 and 4 to bring its temperature to above the thermophilic range before being passed to the digester 6, insuring that any possible short circuiting in the digester will not prevent pasteurization. After digestion, the thickened sludge 7 returns to heat exchanger 2 before passing to sludge disposal line 8. A hot water or steam boiler 9 together with water jacket heat from engine generator 10 forms a heat loop 11 supplying heat to exchanger 4 and digester 6. Gas and water vapor exit the dome of the digester 12. The vapor of the mixture is condensed in 3 and passes along with the gas to pre-chiller 13 where it is further cooled and passes to gas diffuser pump 14. The combined actions of condensing 3, cooling 13, and pumping 14 result in a vacuum in dome 12 that acts to increase the water vapor percentage of the water gas mix allowing for increased pumping of this distilled water and gas mixture at 14 until the desired water removal rate from the digester 6 has been reached. The water gas mixture leaving pump 14 is pre-separated at 15, water 16 is directed to the plant effluent 17, while the gases are directed to main gas diffuser and pump 18 with a bleed off to methane and carbon dioxide controller 19.

Sufficient water flow 20 is slipstreamed off the plant effluent line 17 to insure complete dissolution of carbon dioxide and hydrogen sulfide at a temperature close to freezing in diffuser 18. Water 20 passes through system chiller 22 to diffuser pump 18 where carbon dioxide and hydrogen sulfide are completely dissolved in solution leaving methane to be separated in 23. The cold water containing the dissolved gasses pass through pre-chiller 13 is joined with distilled water 16 added to plant effluent 17. Upstream water 17 is passed through refrigeration condenser 24 absorbing heat and cooling the condenser as dictated by the load on compressor 25.

Pure methane from separator 23 is directed to methane distribution 26, is used to power engine generator 10, boiler 9, as digester pH control 28 through controller 19, and may be optionally sold 27. Electrical power from engine generator 10 is distributed at 29, powers compressor 25, and plant electrical loads 30.

Figure 3:
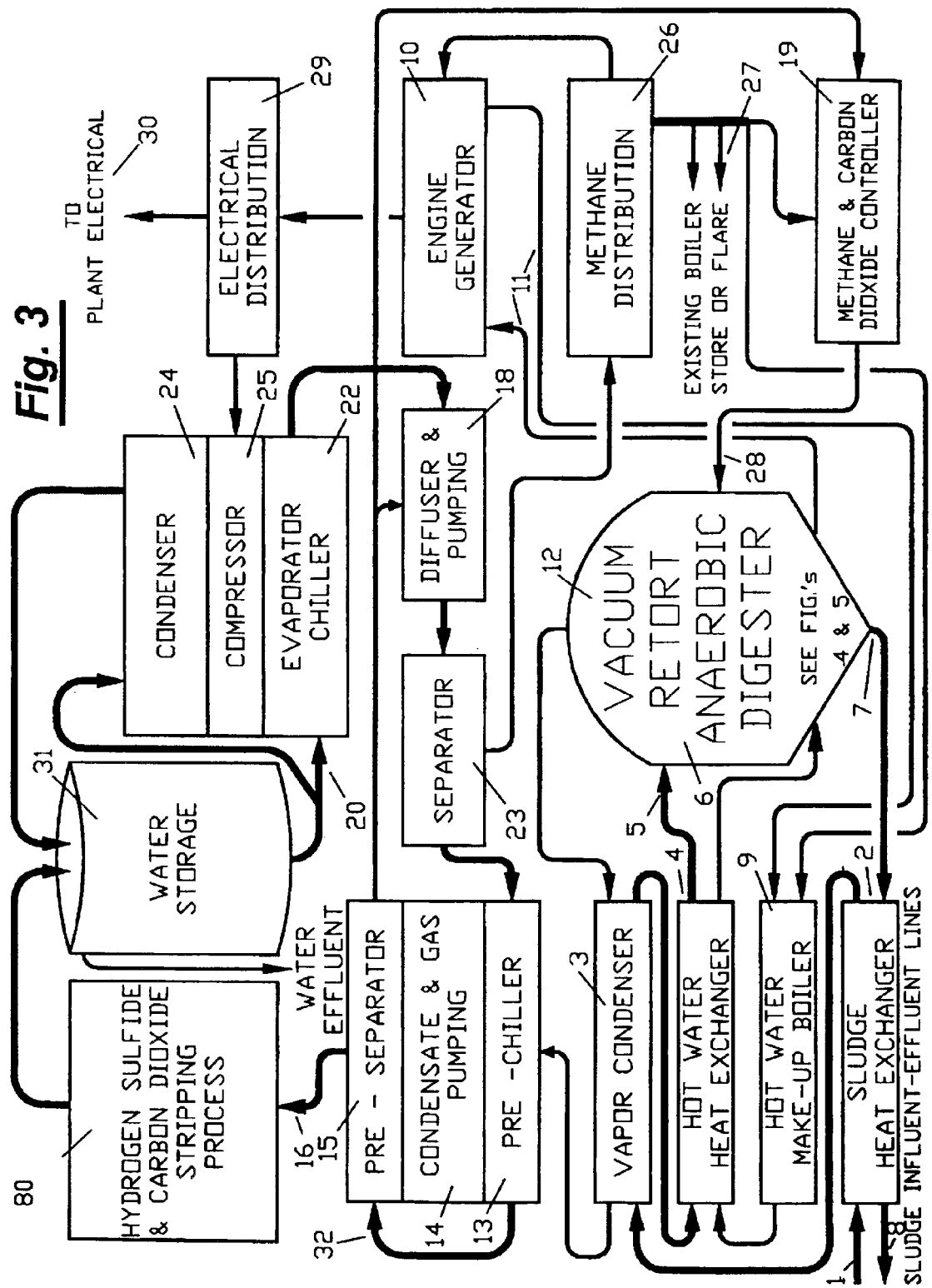
FIG. 3 is a schematic diagram of one embodiment of another anaerobic digestion system incorporating the invention as might, for example, be utilized in a self-contained, fully anaerobic wastewater treatment process in which the system process water is used as the dissolution medium.

In the embodiment of FIG. 3, liquefied biomass feedstock is directed to the process at 1 where it is introduced to heat exchanger 2, raising its temperature. The feedstock is additionally passed through condenser and heat exchanger 3 and 4 to bring its temperature to above the thermophilic range before being passed 5 to the digester 6, insuring that any possible short circuiting in the digester will not prevent pasteurization. After digestion, the thickened sludge 7 returns to heat exchanger 2 before passing to sludge disposal line 8. A hot water or steam boiler 9 together with water jacket heat from engine generator 10 forms a heat loop 11 supplying heat to exchanger 4 and digester 6. Gas and water vapor exit the dome of the digester 12. The vapor of the mixture is condensed in 3 and passes along with the gas to pre-chiller 13 where it is further cooled and passes to gas diffuser pump 14. The combined actions of condensing 3, cooling 13, and pumping 14 result in a vacuum in dome 12 that acts to increase the water vapor percentage of the water gas mix allowing for increased pumping of this distilled water and gas mixture at 14 until the desired water removal rate from the digester 6 has been reached. The water gas mixture leaving pump 14 is pre-separated at 15, water 16 is mixed with gas-water mixture 32 and directed to gas removal 80 and thence to storage 31, while the gases are directed to main gas diffuser and pump 18 with a bleed off to methane and carbon dioxide controller 19.

Sufficient water flow 20 is directed from storage tank 31 to insure complete solution of carbon dioxide and hydrogen sulfide at a temperature close to freezing in diffuser 18. Water 20 passes through system chiller 22 to diffuser pump 18 where carbon dioxide and hydrogen sulfide are completely dissolved in solution leaving methane to be separated in 23. The cold water containing the dissolved gasses pass through pre-chiller 13, line 32 and is joined with distilled water 16, stripped of carbon dioxide and hydrogen sulfide 17 and added to storage 31. Storage water 31 is cycled through refrigeration condenser 24 absorbing heat and cooling the condenser as dictated by the load on compressor 25.

Pure methane from separator 23 is directed to methane distribution 26, is used to power engine generator 10, boiler 9, as digester pH control 28 through controller 19, and may be optionally sold 27. Electrical power from engine generator 10 is distributed at 29, powers compressor 25, and plant electrical loads 30.

Figure 4:
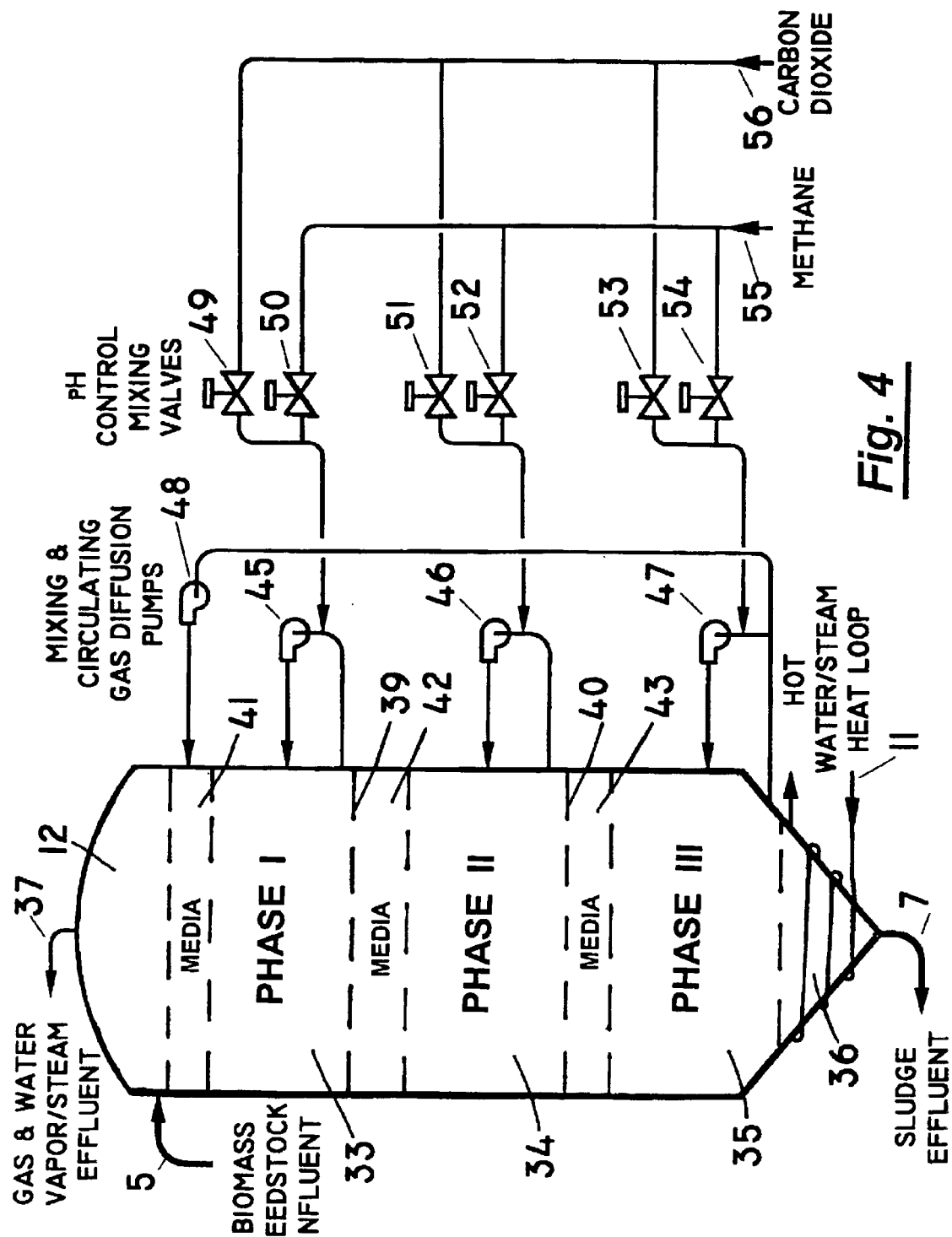
FIG. 4 is a more detailed schematic diagram of an embodiment of a single stage multi-phase anaerobic digester unit with pH control which is particularly suitable for use in the embodiments of FIGS. 1, 2, 3, 6, and 7.

In FIG. 4, a preferred embodiment of a multi-phase digester is depicted schematically. Grid separation and partially packed floating media are depicted together with the liquid-gas mixing and pH control system. Pre-heated biomass feedstock 5 is fed to digester dome 12, where its vapor content along with the gas generated in the digester phases 33, 34, 35, and 36 are removed under vacuum at line 37 and a concentrated digested sludge is removed at line 7. Grids 39 and 40 separate the floating media 41, 42, and 43. Digester phases 33, 34, 35, and 36 are maintained at thermophilic temperature (55° C.) by heat loop 11. Liquid-gas mixing maintained by gas diffusion pumps 45, 46, and 47 together with substrate return pump 48. Automatic control valves 49 through 54 regulate the gas or gas mixture from methane supply 55 and/or carbon dioxide supply 56 as required to maintain the optimum pH in each phase.

Figure 5:
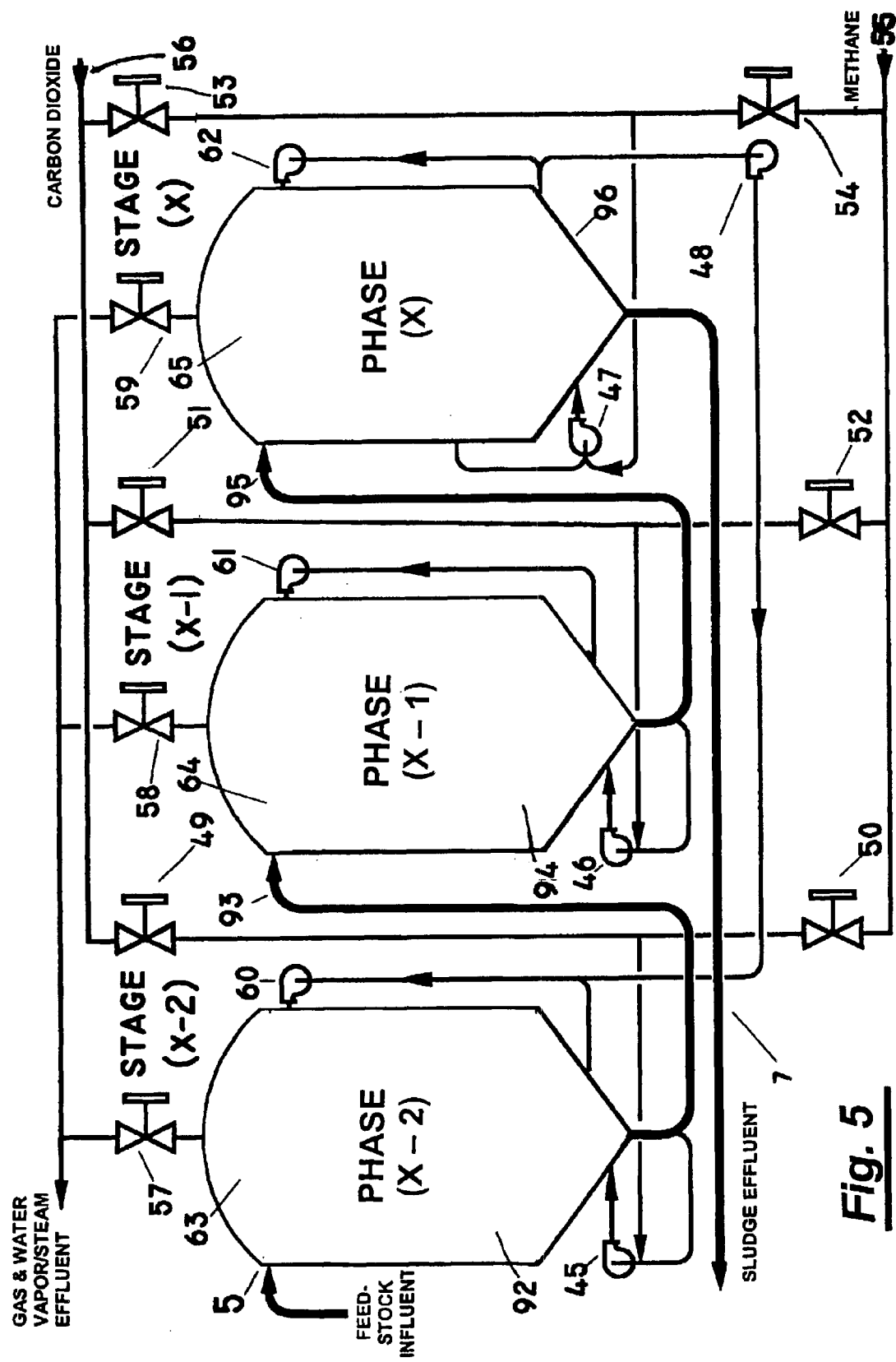
FIG. 5 is a schematic diagram of one embodiment of a multi-stage (series connected), multi-phase anaerobic digester bank with pH control which is particularly suitable for use in the embodiments of FIGS. 1, 2, 3, 6, and 7.

FIG. 5 illustrates a multi-stage, multi-phase digester with feed and pH control. Liquefied biomass feedstock (domestic and/or other) is applied at 5 to the first stage digester 92, through line 93 to second stage digester 94 and finally to third stage digester 96 through line 95. Digested sludge is directed from the final stage by way of line 7. Gas diffusion pumps 45, 46, and 47 circulate the liquid-gas mixture in each stage 92, 94, and 96. Automatic control valves 49 through 54 control the pH in each stage and/or phase by adjusting the flow of methane 55 and/or carbon dioxide 56 to the diffusion pumps 45, 46, and 47. Automatic control valves 57, 58, and 59 isolate the stages and control the relative dewatering rates of each stage by controlling the vacuum in domes 63, 64, and 65. Circulating pumps 60, 61, and 62 re-circulate substrate in each stage and pump 48 re-circulates substrate from the last stage 96 to digester 92 to insure favorable inoculums.

Figure 6:
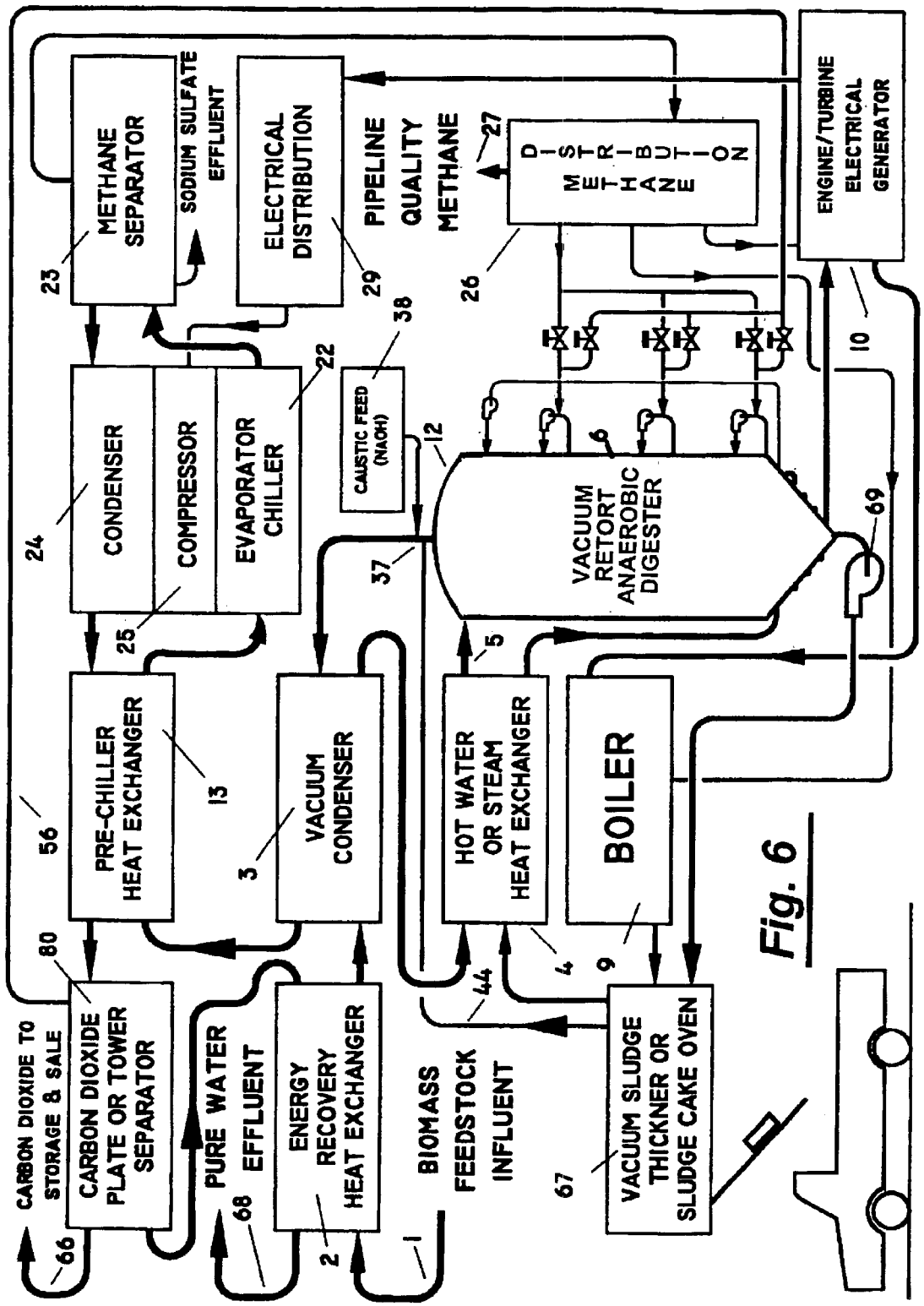
FIG. 6 is a schematic diagram of another embodiment of an anaerobic digestion system according to the invention, which is suitable for use as a stand-alone process system with full pH and sludge thickening control, and process optimization.
Figure 7:
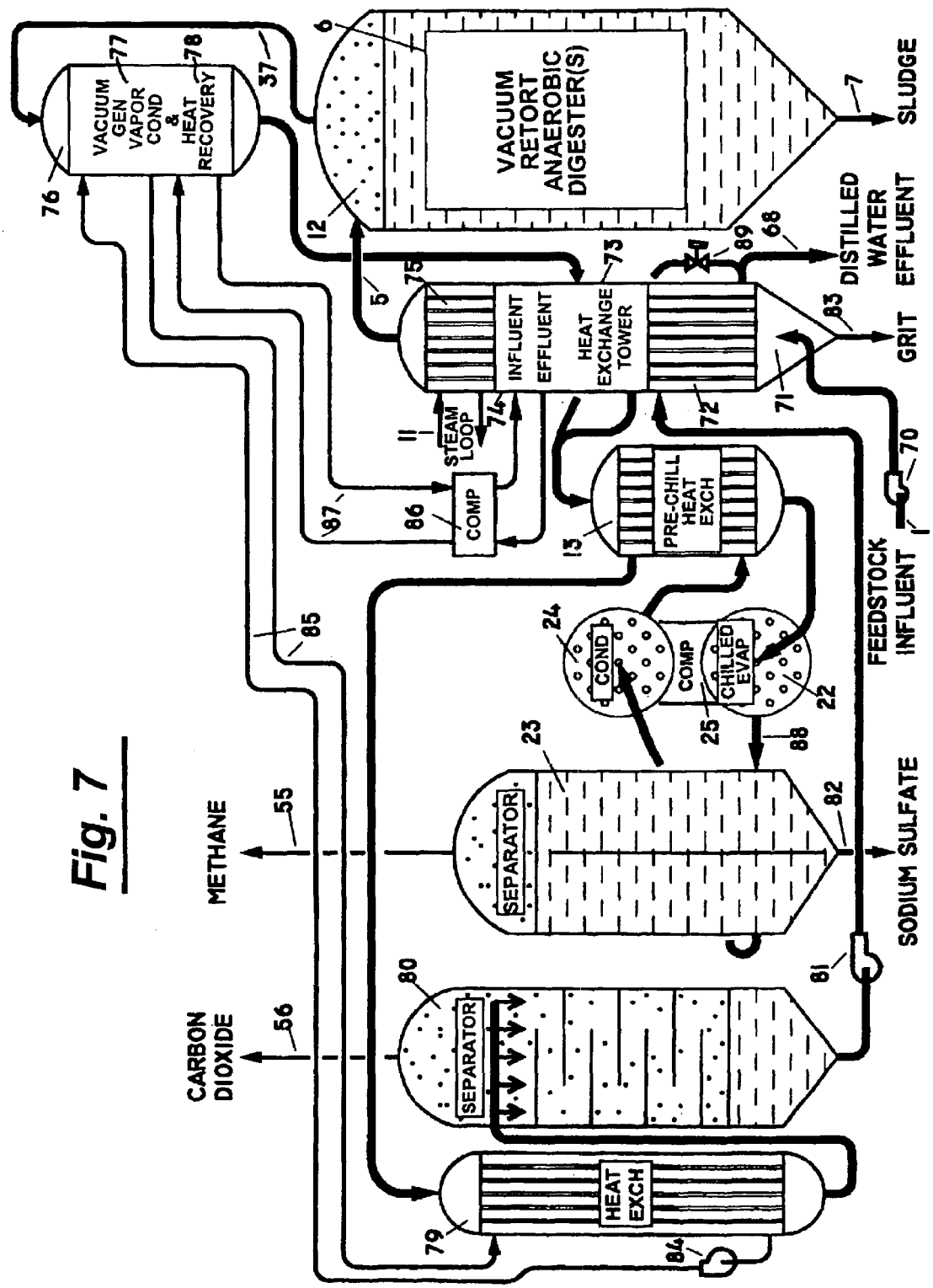
FIG. 7 is a hydraulic profile diagram of and similar to the embodiment of FIG. 6, utilizing the force of gravity to produce a vacuum in the retort dome.

FIGS. 6 and 7 illustrate two similar systems which employ different methods of creating a vacuum in the dome of the digester. In the embodiment of FIG. 6, the vacuum created in the dome is a function of pumping as in the embodiments of FIGS. 1, 2, and 3. In the embodiment of FIG. 7, the vacuum is created in the dome by condensing the vapor at a distance above the dome equal to approximately one atmosphere of water column. The choice between the two can be made on the basis of factors such as capital and operating costs that may vary case to case.

In the embodiment of FIG. 6, liquefied biomass feedstock 1 (domestic and/or other) is progressively fed and heated through energy recovery heat exchanger 2, vacuum condenser 3, and hot water/steam heat exchanger 4, to enter the digester(s) dome 12, where the liquid/vapor fraction that is surplus to digester operation and the gasses produced by digestion are drawn off by the vacuum created from the combined action of condenser 3, pre-chiller heat exchanger 13, chiller evaporator 22, and gas diffusion pump of methane separator 23. A measured amount of sodium hydroxide solution 38 is injected into the vapor-gas vacuum line at the dome outlet 12 in order to neutralize the very active hydrosulfuric acid formed by the hydrogen sulfide gas and water. This chemical reaction produces a useful by-product sodium sulfate (mirabilite) $Na_2SO_4+10H_2O$ that crystallizes at lower temperatures and is removed as a residue from methane separator 23. The distilled water and dissolved carbon dioxide are warmed as they pass through the condenser 24 of refrigeration compressor 25, pre-chiller 13. The bulk of the carbon dioxide gas is stripped from the water in separator 80, part of which goes to distribution in the system 56 and the balance is pumped to storage and sale via line 66. Water from separator 80 passes through energy recovery heat exchanger 2 and out of the system through line 68.

Boiling off the influent water 5 at or near the same rate which it arrives to the process 1 maintains a constant liquid level in the digester dome 12 and allows extended sludge recovery times and maximizes methane production. Methane from distribution element 26 is used to control digester pH, power the boiler 9 and the electrical engine generator 10, and may be sold or used for other purposes via output line 27. Electrical power from engine generator 10 is directed to electrical distribution 29, thence to compressor 25 and other plant loads. Boiler 9 and heat jackets on engine generator 10 provide heat for the exchanger 4, digester 6, and vacuum sludge thickener oven 67. Sludge pump 69 supplies sludge-to-sludge cake vacuum oven 67 and vacuum line 44 carries away its vapor and gasses.

Digester mixing and control in this embodiment are similar to the mixing and control in the embodiments of FIGS. 4 and 5.

In the embodiment of FIG. 7, liquefied biomass feedstock 1 is pumped 70 into the base of shell and tube vertical heat exchange tower 71 where it passes through heat exchange sections 72, 73, 74, and 75 in which it is progressively heated until it is finally exited through line 5 at an elevated temperature of from 55 to 100° C. Effluent in line 5 is directed into the vacuum dome 12 of one of several typical digester configurations 6 where it deposits its biomass solids to the digester 6. The bulk of effluent (nominally 95 to 99% water) either exits the dome directly in the form of water vapor or is added to the digester content as ma e up for digested sludge draw-off 7. Water vapor and diffused gases produced by digestion rise in vacuum line 37 and enter the second vertical heat exchange tower where the vapor is cooled, condensed to water and progressively chilled in heat exchange sections 77 and 78. The condensing point in exchange tower 76 is maintained at approximately the distance of one atmosphere water column above dome 12 and the pipe velocities are maintained at above diffused gas bubbling point in order to keep the vacuum created by this arrangement from being broken.

Due to design flow rates and vapor to gas ratios this vacuum condition can be hard to control, in which case diffusion pumping at can be installed between evaporator 22 and separator 23, if desired.

Effluent from tower 76 enters exchange unit 73 of tower 71 where it is further step cooled before entering pre-chiller heat exchanger 13 and thence to chiller evaporator 22, where it emerges through line 88 at a temperature of 0 to 2° C. for separating the methane component in separator 23. Water and dissolved carbon dioxide flow from separator 23 to condenser 24 where heat removed by compressor 25 is replaced and then increased in pre-chiller 13 before being directed to heat exchanger 79, where it is heated to 30° C. for carbon dioxide separation in separator 80. Water level in separator 80 is maintained by discharge pump 81 and passes through unit 73 of tower 71 to final effluent line 68.

Control valve 89 cycles distilled water back to pre-chiller heat exchanger when higher volatile solids loadings prod more carbon dioxide the water from influent stream can dissolve. Carbon dioxid is removed for pH control and sale through 83. Methane is taken off at 55 to power the system, provide pH control in the digester and for sale or further utilization. Sodium sulfate precipitate is removed at 82 and sand/grit that may have entered the tower 71 is moved at 83. Pump 84 circulates heat generated in vapor condenser 77 to heat exchanger 79 through heating loop 85. Refrigeration compressor 86 removes heat from condensed vapor at evaporator 78 and supplies that heat to tower at condenser exchanger 74 through refrigeration loop 87. Steam from boiler (FIG. 6) transmitted through loop 11 provides final heat to digester feedstock 1 at exchanger 75 of tower 71, and regulates the vaporization rate in dome 12 to meet digestion operational requirements.

Figure 8:
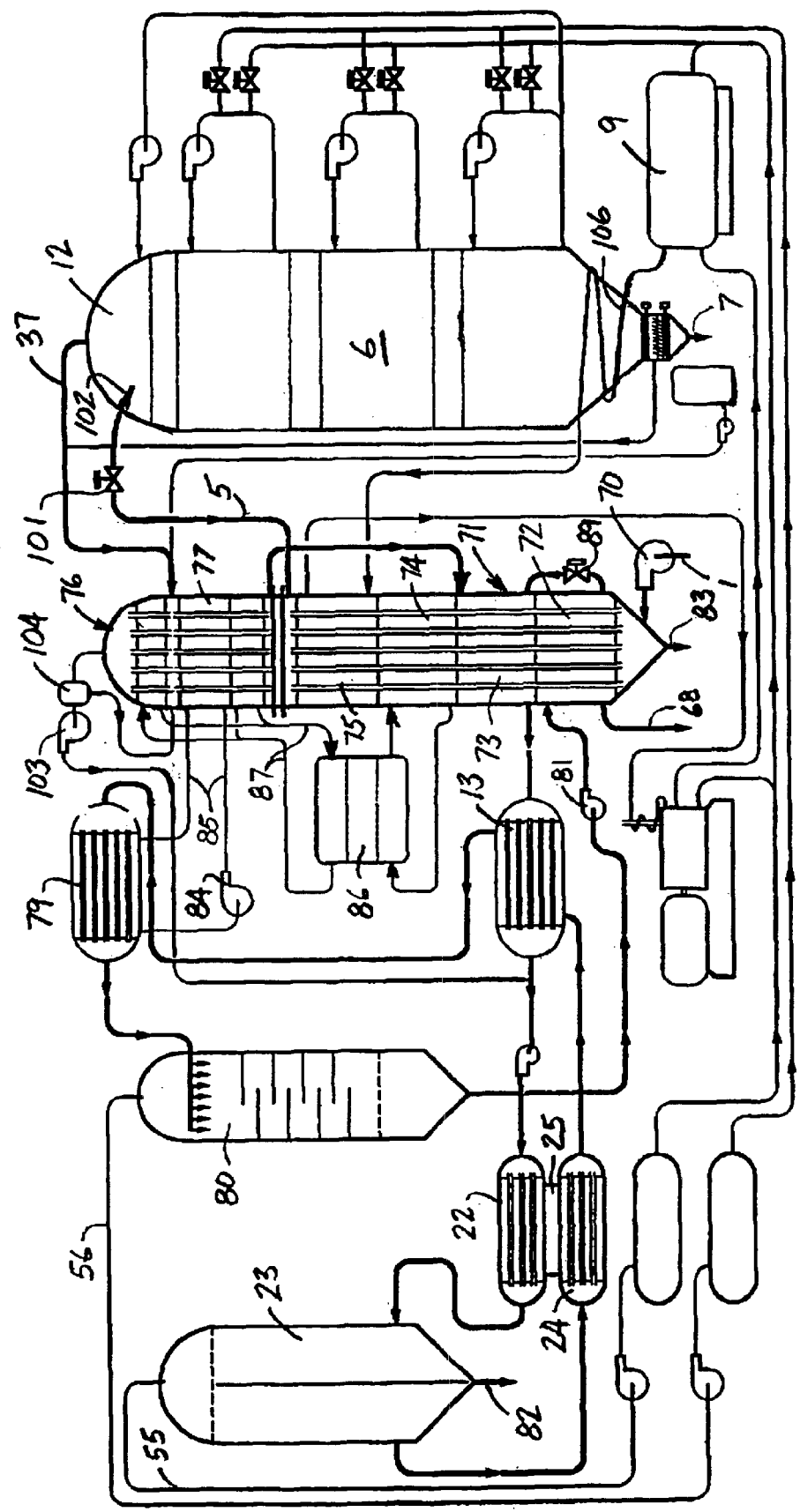
FIG. 8 is a schematic diagram of one embodiment of an anaerobic digestion system incorporating the invention.

The embodiment of FIG. 8 is in some respects similar to the embodiment of FIG. 7, and like reference numerals designate corresponding elements in the two embodiments. A pump 70 delivers liquefied biomass feedstock from inlet line 1 to the base of shell and tube vertical heat exchange tower 71. The feedstock passes upwardly through heat exchange sections 72, 73, 74, and 75 where it is progressively heated to a temperature on the order of 55° C. to 100° C. and a nominal pressure of 250 psi.

The heated and pressurized feedstock passes out of the heat exchange tower through a pressure control valve 101 in line 5 and is directed through a nozzle 102 into the vacuum dome 12 of digester 6. There it explodes into a concentrated high pressure steam spray that is directed downwardly into the surface of the liquor, breaking up scum formation and providing a horizontal swirling mixing motion to the liquor, and delivering its explosively decompressed and fractured biomass solids content to the digester.

The bulk of the influent from the heat exchange tower to the digester (nominally 95 to 99% water) either passes directly out of the dome through line 37 in the form of water vapor or is added to the digester content as make-up for digested sludge drawn off through line 7 and gaseous products removed through line 37.

Water vapor and diffused gases produced by digestion rise in vacuum line 37 are fed to the upper portion of a second vertical heat exchange tower 76 which is formed at the top of tower 71. There, the vapor is cooled, condensed to water and progressively chilled in different sections of the exchanger. The condensing point in exchange tower 76 is maintained at approximately the distance of one atmosphere water column above dome 12, and the pipe velocities are maintained above the diffused gas bubbling point in order to keep the vacuum created by this arrangement from being broken.

In the event that the vacuum condition is hard to control due to design flow rates and vapor to gas ratios, a diffusion pump 103 and a condensate trap 104 can be utilized at the output of exchange tower 76.

Effluent from tower 76 is returned heat exchange unit 73 of tower 71 where it is further step cooled and then delivered to pre-chiller heat exchanger 13. It then passes to chiller evaporator 22 where it is cooled to a temperature on the order of 0° C. to 2° C. for separating the methane component in separator 23.

Water and dissolved carbon dioxide flow from separator 23 to condenser 24 where heat removed by compressor 25 is replaced. They are further heated in pre-chiller 13, then directed to heat exchanger 79, where they are heated to 30° C. or more for carbon dioxide separation in separator 80. The water level in the separator is maintained by discharge pump 81, and effluent from the separator passes through heat exchange unit 72 of tower 71 to final effluent line 68.

Control valve 89 returns distilled water back to pre-chiller heat exchanger 13 when higher volatile solid loadings produce more carbon dioxide than the water from influent stream can dissolve. Carbon dioxide is removed from separator 80 for pH control and sale through output line 56.

Methane is taken off via line 55 at the top of separator 23 to power the system, provide pH control in the digester and for sale or further utilization. Sodium sulfate precipitate is removed from the bottom of separator 23 through discharge line 82, and any sand/grit that may have entered heat exchange tower 71 is removed through discharge line 83. Pump 84 circulates heat generated in vapor condenser 77 to heat exchanger 79 through heating loop 85.

Refrigeration compressor 86 removes heat from condensed vapor in evaporator 78 and supplies that heat to condenser exchanger section 74 of tower 71 through refrigeration loop 87. Steam from boiler 9 is circulated through a heating coil 106 which is wrapped about the lower section of digester 6 and through exchanger section 75 of tower 71 to provide final heat to the digester feedstock and regulate the vaporization rate in dome 12 to meet digestion operational requirements.

This invention separates the two major gas constituent products of the digestive process and makes use of these separated components by using them to control the pH of the various phases of the process in order to optimize the rate and overall efficiency of the digestive process, while performing the mixing function as commonly applied with raw or unseparated gases.

It also provides control of the density or ratio of volatile solids to liquid in the anaerobic digester. One of the major controls that affect the overall efficiency of anaerobic digestion is the concentration of volatile solids. That concentration is preferably on the order of 2%. Below that level, the concentration of volatile solids is too low for the colonization of anaerobic bacteria, and the process comes to a virtual standstill.

There is an optimal concentration for greatest efficiency based primarily upon the ability to mix and transfer the content of the digestive liquor. The invention controls the water content of the liquor by adjusting the vacuum pressure and the resultant distillation rate on the surface of the liquor, thereby providing an effective way of adjusting the process to effect results that are the best from the standpoint of factors such as energy, residuals, gas production, retort size, and the like for any feedstock or combination of feedstocks and for any given bacterial species.

Rather than drying the sludge residue after removal from the digester, the invention makes this process internal to the digester, thereby making direct and most efficient use of the heat and vacuum of the digester providing an effective way to control the dryness of the ejected sludge residue so that in its ultimate state it can be ejected as a dry powder.

In the preferred embodiment, a continuous multi-pitched screw is used to compress the residue, allow it to expand and dry under vacuum, compress it to break the vacuum, and then eject it. If desired, other mechanical devices, such as plungers or pistons can also be used to transport the residue through this drying procedure. The dryness quality is controlled by adjusting the rate at which the residue is ejected.

Creating a vacuum in the dome of the digester in order to evaporate off the liquid in the tank or retort aids the anaerobic digestion process and makes it more useful, economic and practical. Entrainment of the gas in the condensate is controlled by the ratio of the gaseous component to the condensate, the solubility of the gaseous component, the pipe or vessel sizing, and the velocity of the mixture. In situations in which the liquid gas mixture falls outside the gas entrainment envelope and pump cavitation could exist, the process may be enhanced in manner which will enable it to operate over a much wider variation in the gas to condensate ratio. That may, for example, happen during startup, during periods of high gas to condensate production, and/or if the level of the condensate is not high enough above the surface of the liquid in the retort to maintain the natural vacuum which the potential energy would otherwise provide.

In that regard, a vacuum pump and gas trap can be added to the system to prevent the entrained gas from expanding to the point that the vacuum created by the potential and kinetic energy of the system is overcome, and the mixture can be cooled at the entrance to the trap so that excess gas removed by the trap is dry and separated from the condensate or liquid component. The gas is then preferably returned to the process at a point such that it does not break or adversely affect the vacuum within the retort system.

In an anaerobic digester, feedstock is normally introduced into the liquid below the gaseous space referred to as the dome. Depending upon the insertion level, the liquid is at a certain relative positive pressure. By inserting the automatic control valve and nozzle in the feedstock line at the tank inlet and raising the pressure on the feedstock line, the influent water soaked or hydrolyzed feedstock is made to explode as it is decompressed to the pressure of the tank, breaking up the feedstock particles into pieces and breaking up the particles in the tank that are struck by the feedstock particulate. This explosive force is a function of the differential pressure between the feedstock and the pressure of the tank at the influent inlet port and the shape of the nozzle itself. Using a high pressure/temperature gradient, the feedstock will explode into steam. The force of the steam jet leaving the nozzle also produces a mixing of the liquor within the tank.

In the preferred embodiment, the feedstock nozzle is located above the level of the liquid in the tank or dome, a negative or vacuum pressure is maintained in the dome, the feedstock is introduced a temperature somewhat above 55° C. and a pressure greater than atmospheric, and the nozzle has a concentrated pattern which is directed downwardly toward the surface of the liquor and inwardly in a direction generally tangential to a radian arc of the tank. The influent pressure is typically on the order of several hundred pounds above atmospheric, but no more than necessary to optimize digester efficiency. The influent pressure is monitored continuously and adjusted for various feedstocks and balanced against pumping energy costs.

It should be understood, however, that with certain feedstocks, such as those with higher solids content than normally found in primary and secondary sludge, very high pressures (e.g., a thousand pounds or more) may be justified.

Liquid in the feedstock flashes to steam at the nozzle outlet, and the orientation of the nozzle maximizes the inertial impact of the steam upon the surface of the liquor without causing excessive splashing and in a fashion that maximizes the swirling mixing motion of the liquor within the tank. The thickness of the scum layer is continuously monitored by one of the standard instrumentation techniques, and the pressure to the nozzle is adjusted to control the build-up of this layer.

The invention eliminates the problem of gas bubbles preventing solid matter from settling. The vacuum in the dome allows the process to continuously boil off the water component of the waste to make room for influent liquor and to control concentrations and maintain the highest conversion rate within the reduction phases at all times. It also enhances the mixing system in holding solid particles in suspension as long as they contain biomass that can be converted into gas so that the solids that do finally settle to the bottom of the tank, where they are extracted, consist mainly of metals and relatively inert inorganic compounds.

There is no need for supernatant wasting to control and rid the process of excess liquid, and the separation and inherent advantages heretofore realized only in systems having multiple phase separation tanks are achieved with a single tank and in such a manner that allows for much smaller tank size.

Gas mixture relations remain relative stable over wide variations of bio-feedstock, and it has been found that certain feedstocks, containing sugars for instance, produce significant quantities of hydrogen gas which is valuable for its energy content. It also produces methane which is the most abundant and easily produced hydrocarbon fuel of choice for the hydrogen fuel cell and carbon dioxide which is the carbon of choice for the production of nanotubes. Gas production rates are a function of the type and density of the bio-feedstock, the heat range or strain of anaerobic bacteria, and general digester efficiency. The ability to produce all three of these gases is a quantum leap in increasing general and overall anaerobic digestion efficiency.

With the invention, there is no minimum volatile solids requirement, and that all bio-solid liquor mixtures can be anaerobicly reduced irrespective of their bio-solid concentrations. However, bacterial colonization is greater and the process is generally more efficient and productive with a denser liquor in the digester, and the use of denser feedstocks (e.g., garbage, trash, and the like) may also have overall advantages from an environmental standpoint. The ability of the invention to control absolutely the density of the biomass liquor by controlling the rate of distillation is a new and important improvement in the optimization of the digestion process.

Also, depending upon the feedstock, there has generally been an operating point at which it becomes more efficient to transfer a portion of the treated influent to aerobic processing. This limitation can be overcome to some extent by the addition of external bio-solids (e.g., food, animal or agricultural solids, grass clippings, tree trimmings, cardboard, and other bio-waste products) to the anaerobic influent. Therefore, the ability of the invention to control and maintain a desired optimum ratio of water to bio-solids in the digester eliminates the need to use aerobic processing in many situations.

Anaerobic digesters have been operated in a number of temperature ranges, and the invention is applicable to all anaerobic digesters regardless of temperature. Most digesters operate in either the mesophilic range (35° C.) or the thermophilic range (55° C.). With the invention, thermophilic operation is preferred because the reduction time for the volatile solids is only about one-third of what it would be in a mesophilic digester.

The partial pressures of the gases in the dome are a function of the temperature and pressure in the dome, and the quantity of methane, carbon dioxide, and hydrogen sulfide available to this mixture is limited by the digester gas production rate. However, the quantity of water vapor available is limited only by the water content of the liquor, the temperature of the vessel, and the pressure in the dome. Since the influent liquor is generally more than 95% water, the quantity of water vapor available is essentially unlimited for practical purposes.

Since the temperature of the vessel is set by the anaerobic requirement, the surface of the liquor may be considered constant at 55° C. However, the total pressure and to some extent the temperature in the gaseous space in the dome above the liquor may be varied widely and will have virtually no effect upon the temperature or operation of the digestion process. Of course, at the lower dome pressures gas bubbles will rise faster, the effect of the mixing gas will increase, and the mixing gas supply pressure requirement will decrease. These are all important positive and desirable aspects of the invention.

Decreasing the pressure by creating a vacuum in the dome increases the partial pressure of water vapor and increases the ratio of water vapor to gas. The water vapor can then be drawn off to lower the ratio of water to volatile solids in the vessel at a rate and to an extent that controls and maximizes the production of methane and the recovery of volatile solids.

At a temperature of 55° C., water boils under a vacuum of 12 psi relative to standard conditions. In the range between atmospheric pressure (14.7 psia) and 12 psi vacuum (3 psia), the water vapor available to be drawn off by the process increases in a linear fashion, and heat is drawn from the process. At the boiling point however, the rapid boiling of the water impedes further reduction in pressure. At this low pressure, the rate of boiling is a function of the heat of vaporization, and there is generally a sharp rise in the heat drawn from the system which requires a corresponding rise in additional heat that must be applied to the vessel influent in order to maintain the thermophilic temperature.

With the invention, the influent feedstock is primarily water vapor or a steam-gas mixture, and the condensation and heat exchange of that feedstock dramatically reduces the requirement for make-up heat to the system. The vacuum in the retort dome is created and controlled by the condensing action and the pumping or pulling off by gravity of this condensate gas mixture. The pumping of this predominantly water mixture by elevated water column and/or gas diffusion liquid pumping is a major energy saving part of the invention. The pumping can be performed by special vortex, centrifugal, or other suitable pumps.

The elevated operating temperature of the bio-solid feedstock provides improved solids separation characteristics, and the hot water, vapor, or steam introduced above the level of the liquor is more readily drawn off into the condenser heat exchange unit. The heated feedstock introduced to the dome above the scum layer drops rapidly from atmospheric pressure to a relative high vacuum pressure, which causes it to expand, puff up, or explode, thereby helping to break up the scum layer, reduce foaming, and make use of the additional surface area of the particles and this rough and uneven surface to enhance vaporization in the dome and facilitate bacterial action.

The raw gas generated in wastewater, solid waste and/or landfill processes is recycled in order to provide mixing of the liquor in the digestion process. The use of raw gas in mixing is an aid to bacterial growths that break down the bio-solids in the anaerobic digestion process. The recycling of the raw gas provides a new important control feature and applies to all gas mixing methods.

Anaerobic digestion is basically a two-phase process. It is the combined action of two forms of bacteria that live together in the same environment and are commonly referred to as the "acid formers" and "methane fermenters". It has been found advantageous to separate or transition these phases to some degree as an aid to keeping a balance between these two bacteria. Acid formers are abundant in raw sewage. Methane fermenters are not nearly so prevalent and require a pH of about 6.6 to 7.6 to produce. A digester is sensitive to too much food, and it may easily become too acidic, or "go sour", and fail to produce the desired innocuous dewaterable sludge and valuable methane the acid phase is allowed to predominate. The invention separates the components of the mixing gas, controls the volumetric gas flow, and stabilizes the operating phase over a much broader range of feed conditions by regulating the content of the mixing gas in the various phases.

The carbon dioxide content forms carbonic acid ($H_2CO_3$), which when returned to the digester as a component of the mixing gas moves the balance in the direction of the acid formers and can be used to enhance their activity in the acid phase. However, the methane component, in addition to being a valuable constituent as a gas that may be drawn off the system for energy, is also a valuable mixing gas in the pure state provided by the invention.

As a mixing gas, methane slows the acid forming phase and enhances the fermenting phase. Increasing the volumetric presence of methane gas at any point or phase of the process lessens the effect of the acid and drives the pH of that phase in a positive direction. Therefore, the controlled use of carbon dioxide and methane after separation in the process not only aids in the mixing of the digester constituents, but also controls the pH of the phases, thereby increasing the speed and efficiency of the digestive process, By removing water vapor and hydrogen sulfide gas from the system, the invention prevents them from forming hydrosulfuric acid which might otherwise condense in the lines and corrode expensive process equipment and instrumentation. This significantly improves the mean time between failures and reduces maintenance costs.

The methane gas produced by the invention is clean (98.5% pure), dry (less than 1% moisture), cold (less than 5° C.), and therefore quite dense, and it is produced at atmospheric pressure. In addition, the invention also overcomes limitations and disadvantages of prior methods of scrubbing or separating methane from the other raw gas constituents and enhances the operational efficiency of the plant.

The volumetric efficiency of the substantially pure methane gas produced by the invention is substantially higher than that of a gas containing a relatively high percentage (e.g., 40%) of an inert gas such as carbon dioxide. It permits smaller, less expensive engines to be used for applications such as pumping or generating, with greater operating efficiency. Moreover, eliminating carbon dioxide from the combustion process means less greenhouse gases in the atmosphere and better environmental conditions.

Prior to the invention, the thermophilic digestion process was generally not considered to be an economically viable solution to the treatment of bio-solids in a full sized digester because of the cost of maintaining the temperatures required for thermophilic operation. By providing the necessary heat, the invention has made the process practical, which is an important improvement since thermophilic digestion is over three times as fast and produces more than three times as much useful output (e.g., methane gas) as mesophilic digestion. Thus, the basic digester efficiency is increased by a factor of three.

Another practical advantage of the invention is the relative low cost of adding reserve tankage as compared to conventional tanks. With the invention, the minimum size is determined and limited only by the size required to be able to pump or auger the inert sludge, reserve space may be used for shutdowns, upsets and other unforeseen circumstances, while providing optimal sludge reduction times during normal operation of the system.

Sludge from the secondary sedimentation basins and the aerobic treatment processes tends to be thinner than sludge from primary sedimentation basins.

In order to handle secondary sludge effectively, whether it is used in direct land application or cycled through the digester, it is customary to thicken it. This requires rather elaborate and expensive apparatus with certain chemicals such as polymers to aid the process. By cycling all sludge through the retort digester, the invention eliminates the need for a separate sludge thickening process. Thickening of the sludge in the digester takes place automatically and continually as the water is removed from the vacuum retort digester.

The thermophilic process of the invention has a further advantage in that subjecting the sludge to thermophilic temperatures for as little as one quarter hour pasteurizes it to below harmful pathogens levels so that it is suitable for unrestricted use and access land applications. All sludge passing through the system is automatically pasteurized, and the need for special, expensive equipment and additional processing steps for pasteurizing the sludge is eliminated.

The carbon dioxide and hydrogen sulfide which are removed from the raw digester gas and dissolved in the water that is inserted into the secondary effluent stream control the pH of the effluent and prevent it from becoming excessively alkaline. This also reduces the amount of chlorine required for disinfection and reduces the discharge of carbon dioxide to the atmosphere, as well as eliminating the need for additional equipment for injecting the carbon dioxide.

The carbon dioxide provides superior process control by virtue of its self-buffering characteristics. It is being used to replace older systems that use hydrochloric acid, sulfuric acid or acetic acid. When applied to retrofit digesters or installed as a partial treatment process in an existing plant in which the distilled process water is to be added to the plant effluent, only partial de-carbonization need take place in the system. The remaining carbonization buffers the effluent water.

The invention has a number of important features and advantages. It controls the pH of the various phases of the process in order to optimize the rate and overall efficiency of the digestive process, while also controlling the density of the liquor and the moisture content of the final effluent. It also effectively prevents and breaks up the formation of scum on the surface of the liquor. Tank size is reduced, good ratios of volatile solids to liquid are maintained, pumping, mixing, and handling are controlled in a consistent manner, and digestion rates are optimized.

It is apparent from the foregoing that a new and improved anaerobic system and process have been provided. While only certain presently preferred embodiments have been described in detail, as will be apparent to those familiar with the art, certain changes and modifications can be made without departing from the scope of the invention as defined by the following claims.

What is claimed is:

1. An anaerobic digestion system, comprising a retort vessel for processing a liquor consisting essentially of a liquid and a digestible biomass, a space above the liquor in which liquid vapor and gaseous products of digestion can collect, means for maintaining a vacuum pressure in the space above the liquor, and means for introducing a pressurized feedstock into the vessel at a thermophilic temperature so that the feedstock explodes into a concentrated high pressure steam spray and fractured biomass solids that are directed onto the surface of the liquor in a manner which serves to break up any scum on the surface and produce a mixing of the fractured biomass solids and the biomass in the liquor.

2. The system of claim 1 wherein the means for introducing the feedstock includes means for introducing the feedstock into the vessel at a temperature on the order of 55° C. to 100° C. and a pressure on the order of at least about 250 psi.

3. The system of claim 1 wherein the means for introducing feedstock includes means for introducing the feedstock into the vessel at a pressure on the order of several hundred pounds per square inch.

4. An anaerobic digestion process comprising the steps of: processing a liquor consisting essentially of a liquid and a digestible biomass in a retort vessel with a space above the liquor in which liquid vapor and gaseous products of digestion can collect, maintaining a vacuum pressure in the space above the liquor, and introducing a pressurized feedstock into the vessel so the feedstock explodes into a concentrated high pressure steam spray and fractured biomass solids that are directed onto the surface of the liquor in a manner which serves to break up any scum on the surface and produce a mixing of the fractured biomass solids and the biomass in the liquor.

5. The process of claim 4 wherein the feedstock is introduced into the vessel at a temperature on the order of 55° C. to 100° C. and a pressure on the order of at least about 250 psi.

6. The process of claim 4 wherein the feedstock is introduced into the vessel at a pressure on the order of several hundred pounds per square inch.

7. An anaerobic digestion system comprising a retort vessel for processing a liquor consisting essentially of a liquid and a digestible biomass, and means for introducing a pressurized feedstock into the vessel so that the feedstock explodes into a concentrated high pressure steam spray and fractured biomass solids that are directed onto the surface of the liquor in a manner which serves to break up any scum on the surface and produces a mixing of the fractured biomass solids and the biomass in the liquor.

8. The system of claim 7 wherein the means for introducing the feedstock includes means for introducing the feedstock into the vessel at a pressure on the order of several hundred pounds per square inch.

9. The system of claim 7 wherein the means for introducing the feedstock includes means for introducing the feedstock into the vessel at a thermophilic temperature.

10. An anaerobic digestion process comprising the steps of: processing a liquor consisting essentially of a liquid and a digestible biomass in a retort vessel, and introducing a pressurized feedstock into the vessel so that the feedstock explodes into a concentrated high pressure steam spray and fractured biomass solids that are directed onto the surface of the liquor in a manner which serves to break up any scum on the surface and produces a mixing of the fractured biomass solids and the biomass in the liquor.

11. The process of claim 10 wherein the feedstock is introduced into the vessel at a pressure on the order of several hundred pounds per square inch.

12. The process of claim 10 wherein the feedstock is introduced into the vessel at a thermophilic temperature.

13. An anaerobic digestion system comprising a digester having means for processing a biomass liquor in a plurality of successive phases, means for collecting gas produced by the digestive process and separating the gas into methane and carbon dioxide components, and means for feeding the methane and the carbon dioxide back to the phases in the digester to control the pH in each of the phases.

14. The system of claim 13 including means for individually controlling the amount of methane and the amount of carbon dioxide fed back to each of the phases.

15. An anaerobic digestion process comprising the steps of: processing a biomass liquor in a plurality of successive phases in a digester, collecting gas produced by the digestive process and separating the gas into methane and carbon dioxide components, and feeding the methane and the carbon dioxide back to the phases in the digester to control the pH in each of the phases.

16. The process of claim 15 including the step of individually controlling the amount of methane and the amount of carbon dioxide fed back to each of the phases.

* * * * *